Oct. 31, 1933.  H. L. FLATHER  1,933,524
WORK ROTATING STRUCTURE FOR MACHINE TOOLS
Filed March 17, 1931  2 Sheets-Sheet 1

Inventor:
Herbert L. Flather,
by Emery, Booth, Varney & Townsend
Attys

Oct. 31, 1933.                H. L. FLATHER                 1,933,524
                  WORK ROTATING STRUCTURE FOR MACHINE TOOLS
                        Filed March 17, 1931        2 Sheets-Sheet 2
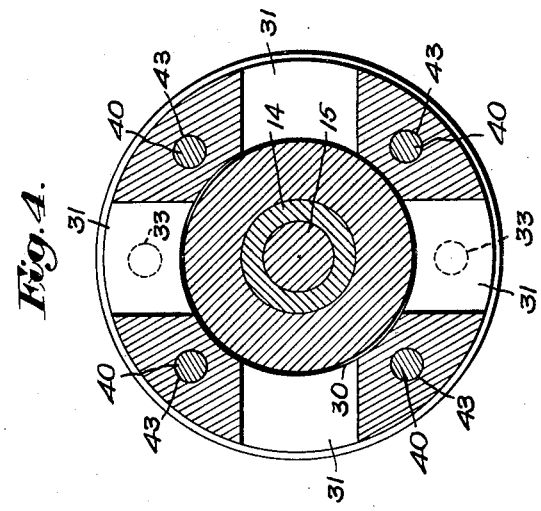
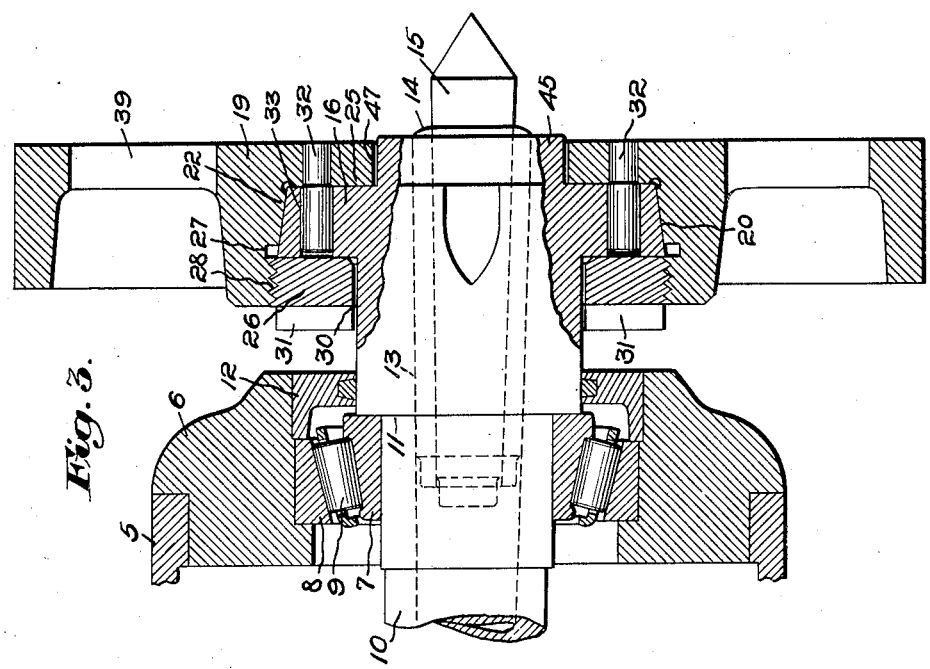
Inventor
Herbert L. Flather
by Emery, Booth, Varney & Townsend
Attys.

Patented Oct. 31, 1933

1,933,524

UNITED STATES PATENT OFFICE 1,933,524

WORK-ROTATING STRUCTURE FOR MACHINE TOOLS

Herbert L. Flather, Nashua, N. H.; Joseph H. Flather and Herbert H. Flather administrators of said Herbert L. Flather, deceased Application March 17, 1931. Serial No. 523,293

5 Claims. (Cl. 82—30)

This invention relates to mountings for face-plates, chucks, fixtures and similar parts on spindles of lathes and other machine tools. The conventional mounting comprises a screw-thread on the spindle and a mating thread on a part to be mounted. That type of mounting has several objections, among which may be mentioned, first, lack of rigidity when subjected to heavy strains; second, inaccuracy, because it has been demonstrated that it is impossible to put on and take off a face-plate or other similar part repeatedly, without the threads becoming worn and inaccurate; third, that if a spindle running at present-day speeds be stopped suddenly, the momentum of the part screwed to the spindle is sufficient to cause such part to unscrew from the spindle, with the possibility of causing damage to the work and to the machine, and injury to the workman; and fourth, the necessity of the exercise of great care on the part of the workman to see that the screw-threads are free from foreign matter, and properly lubricated before being screwed together. When neglect of this kind occurs, the parts become jammed, or "frozen" together, with the result that the screw-threads are damaged and in extreme cases injured beyond repair.

The object of my invention is to overcome these objections, and to provide a more simple, rigid, accurate and durable means for mounting face-plates, chucks, fixtures and other parts on the ends of spindles, or their equivalents. Although the spindle shown in the drawings is that of a lathe, my invention is not limited to that particular machine, as the invention may be employed advantageously in any situation where the results desired are similar to those which are found desirable in lathe work.

The invention will best be understood by reference to the following description, when taken in connection with the accompanying drawings of one specific embodiment thereof, while its scope will be pointed out more particularly in the appended claims.

In the drawings:

Fig. 3 is a longitudinal, sectional view, showing a face-plate substituted for the chuck; and Fig. 4 is a sectional view on line 4—4 of Fig. 2.

Figure 2:
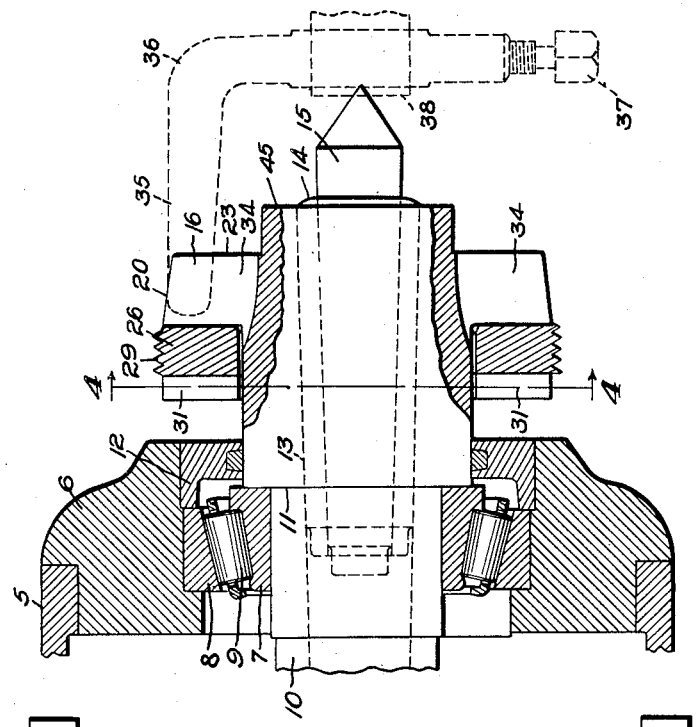
Fig. 2 is a longitudinal, sectional view of the structure with the chuck removed, and with a lathe dog in place.

Referring to the drawings, and to the embodiment of the invention which is illustrated there-in, there is shown a portion of a head-stock 5 of a lathe, and in this head-stock, there is a front spindle bearing mounting 6, in which there is mounted an appropriate bearing, herein a roller bearing, comprising inner and outer races 7 and 8 and a set of rollers 9. A spindle 10, mounted in the inner race, is provided with a shoulder 11, which rests against the outer end of the race. A lubricant-retaining ring 12, seated within the bearing mounting, prevents the escape of lubricant from the bearing. The spindle is provided with a usual internal taper 13, to receive a taper socket 14, the latter in turn receiving a usual lathe center 15.

Figure 1:
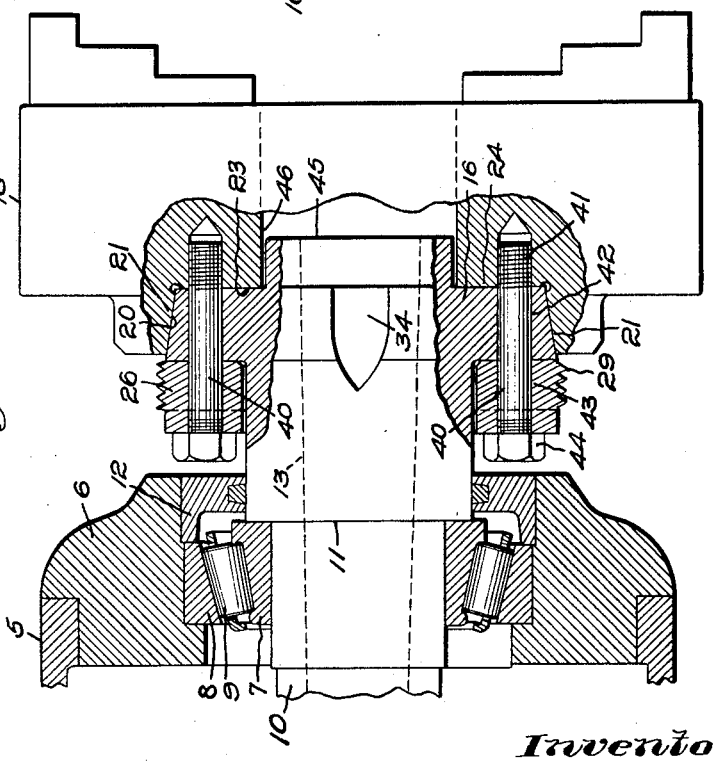
Fig. 1 is a longitudinal, sectional view of a work-rotating structure exemplifying the invention, showing a chuck in place on the spindle.

In accordance with my invention, the spindle is provided with an enlargement in the nature of an annular flange 16, which is received in a chamber 17 presented by a body, which, as shown in Fig. 1, is a chuck 18, and for this chuck there may be substituted a face-plate 19, shown in Fig. 3, or any other fixture, or similar part. In the embodiment shown, the enlargement or flange 16 has a peripheral, tapered surface 20, which snugly fits a corresponding surface 21 in the chuck, or a corresponding surface 22 in the face-plate, and the enlargement has a face 23, which contacts with a corresponding face 24 within the chuck, or a corresponding face 25 within the face-plate. Thus, the chuck and the face-plate are interchangeable, and either, when mounted upon the spindle, is positioned accurately on the latter concentric with its axis.

In the case of the face-plate, the latter is drawn into its proper position on the spindle by a collar 26, interposed between the spindle bearing and the enlargement 16, and to bring the face-plate fairly close to the bearing, this collar is received in a chamber 27, the latter being provided with an internal screw-thread 28, to receive an external screw-thread 29 presented by the collar. This collar bears against the rear face of the enlargement 16, and when turned in the proper direction, will cause the face-plate or other body to be seated firmly and accurately thereon. The internal surface of the collar is separated from the spindle by a clearance space 30, which in practice is five-thousandths of an inch, but in the drawings is exaggerated to bring out the fact that the collar is in the nature of a floating element, which has no part in centering the face-plate or other body 19, its sole function being to draw the body into place, and to maintain it in firm engagement with the enlargement on the spindle.

Rotation of the collar is accomplished conveniently by extending the same rearwardly toward the spindle bearing a sufficient distance to enable it to be provided with a set of radial slots 31 (see Fig. 4), to receive a flat bar (not shown), by means of which the collar may be turned. While the described fastening means might in and of itself be sufficient to prevent turning of the body on the spindle, in the present example, the body is provided with one or more, herein a plurality of driving pins 32, secured to the body and projecting therefrom into corresponding openings 33 provided in the enlargement 16 of the spindle.

In Fig. 2, the face-plate has been removed, and the spindle has been turned through an angle of 90 degrees, to show the fact that the enlargement is provided with a pair of slots 34 to receive a tail 35 of a work-driver such as a usual dog 36, having a set-screw 37 by which it is secured to a work-piece 38, the dog and the work-piece being shown in dotted lines. Any conventional means for driving the work may be used equally well. The dog shown is of small dimensions, and thus may be used without the face-plate in place. The direct connection of the work-driver to the spindle affords a positive drive, as nothing can come apart. When larger dogs are employed, they are of course used in connection with the face-plate in the usual manner, by providing the latter with slots 39.

As an alternative means of securing a body, such as the chuck 18, to the spindle, I have provided a plurality of members, herein studs 40, extending lengthwise of the axis of the spindle, and secured to the body as by screw-threads 41. In applying the body to the spindle, these studs are passed through openings 42 in the enlargement 16, and also through corresponding openings 43 in the ring 26. As herein shown, the openings 43 are disposed between the slots 31 (see Fig. 4). These studs of course prevent rotation of the chuck or other body with relation to the spindle. The chuck or other body is drawn firmly into place, and is maintained in its proper position by the provision of nuts 44, threaded onto the inner ends of the studs, and bearing against the rear face of the collar 26.

As herein shown, the spindle is provided at its front end with a reduced portion 45, which is loosely received in a bore 46 presented by the body 18, or a corresponding bore 47 presented by the body 19, thereby to assist in sustaining the weight of the body on the spindle, while the body is being applied to the spindle. This projection, however, does not center the body, as the tapered surfaces only are relied upon for that purpose.

Thus it is apparent that the two described fastening means may be employed alternatively to secure one body or the other to the spindle.

Having thus described one embodiment of the invention, but without limiting myself thereto, what I claim and desire by Letters Patent to secure is:

1. In a work-rotating structure for machine tools, the combination of a spindle provided with an enlargement to support a plurality of interchangeable, work-rotating bodies, and alternatively available means to secure said bodies to said spindle, one of said means comprising a ring loosely mounted on said spindle and adapted to be rotated independently of said spindle, said ring being provided with screw-threads for engagement with screw-threads in one of said work-rotating bodies; the other of said means including a plurality of threaded members having engagement at one set of ends with the other of said work-rotating bodies, said threaded members extending parallel to the axis of said spindle and through said enlargement and nuts having screw-threaded engagement with the other set of ends of said members, respectively, axially inwardly with relation to said enlargement.

2. In a work-rotating structure for machine tools, the combination of a spindle provided with an enlargement to support a plurality of interchangeable, work-rotating bodies, and alternatively available means to secure said bodies to said spindle, one of said means comprising a ring loosely mounted on said spindle and adapted to be rotated independently of said spindle, said ring being provided with screw-threads for engagement with screw-threads in one of said work-rotating bodies and having a plurality of holes extending therethrough parallel with the axis of said ring; the other of said means including a plurality of threaded members adapted for engagement at one set of ends with the other of said work-rotating bodies, said threaded members extending parallel to the axis of said spindle, through said enlargement, and through said holes in said ring, and nuts having screw-threaded engagement with the other ends of said members, respectively, axially inwardly with relation to said enlargement.

3. In a work-rotating structure for machine tools, the combination of a spindle having means to support a plurality of interchangeable work-rotating bodies, and alternatively available means to secure said bodies to said spindle, the last-mentioned means comprising a ring about said spindle and having a thread for engagement with one of said bodies and having a plurality of openings, and a plurality of threaded members extending lengthwise of the axis of said spindle and through a part of the latter and through said openings to secure the other body in place.

4. In a work-rotating structure for machine tools, the combination of a spindle having means whereby a plurality of work-rotating bodies may be interchangeably supported on said spindle, and alternatively available means to secure said bodies to said spindle, said means including a ring about said spindle to secure one of said bodies thereto, and a plurality of fastening members extending through a part of said spindle and through said ring and adapted to cooperate with said ring to secure the other of said bodies to said spindle.

5. In a work-rotating structure for machine tools, the combination of a spindle provided with an enlargement having a set of openings, said enlargement being adapted to support a plurality of work-rotating bodies interchangeably, and alternatively available means to secure said bodies to said spindle, said means including a ring about said spindle to secure one of said bodies thereto, said ring being provided with a set of openings, and a plurality of fastening members adapted to be received in both sets of said openings to secure the other of said bodies to said spindle.

HERBERT L. FLATHER.